Nov. 11, 1969   K. Y. BRANCATO   3,477,165
LIVE-BAIT CARRIER
Filed Dec. 5, 1967

INVENTOR.
Kenneth Y. Brancato
BY William E. Gleave
ATTORNEY

United States Patent Office 3,477,165
Patented Nov. 11, 1969

3,477,165
LIVE-BAIT CARRIER
Kenneth Y. Brancato, 6378 Columbia Ave.,
Philadelphia, Pa. 19151
Filed Dec. 5, 1967, Ser. No. 688,193
Int. Cl. A01k 97/04
U.S. Cl. 43—55        9 Claims

ABSTRACT OF THE DISCLOSURE

The present live-bait carrier provides an advantageous fabrication of preformed sections. Further, the present live-bait carrier provides: a stand-up means which enables the user to place the carrier upright in a boat or on a dock in such a manner that bait can readily be removed therefrom; an air chamber which keeps the carrier right-side up in the water; a self-locking door which does not spuriously open but which opens in such a manner as to enable the bait to be readily removed from the carrier; and an aperture arrangement in the body of the carrier which permits the water therein to be readily drained therefrom as the carrier is removed from the lake, river, pond, etc. and which is so located that water can enter the carrier to submerge the bait therein without excessive pressure on the bait if the carrier should be towed.

---

Figure 1:
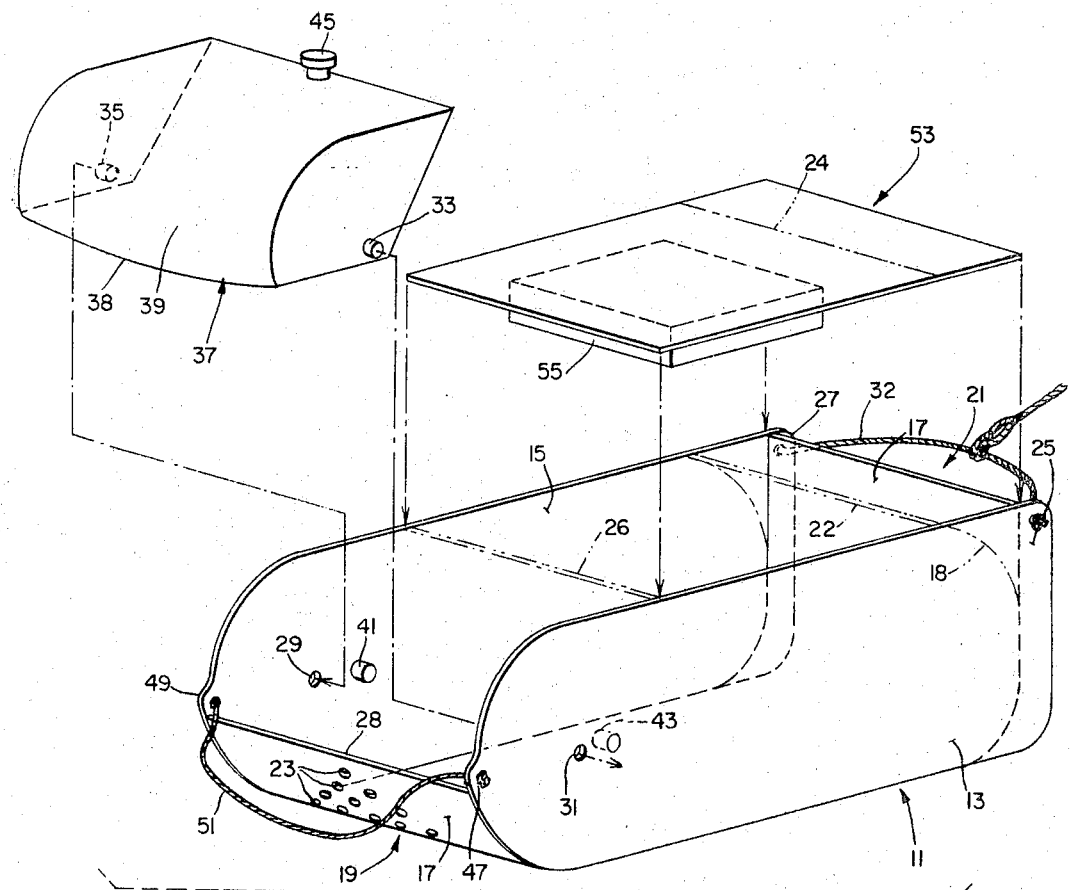

In the normal practice of providing live bait for fishing excursions, many forms of live-bait carriers have been employed. Certain of the prior art live-bait carriers have emphasized features which enable the bait to experience a fresh flow of water thereacross without too forceful a flow thereof. Others have featured the ability to be submerged in response to being towed, while others have included features to automatically lift the bait from the carrier when the carrier lid is opened, and there have been other forms of carriers with other features.

Each of these devices, however, has necessitated relatively elaborate construction, thereby making them costly and none has provided the twofold combination of a means to hold the bait in water when the carrier is out of the pond, lake, river, etc. (for instance, in the hauling thereof from the place where the bait is obtained to the fishing location) with a means to readily drain the water from the carrier when lifting the bait carrier from the river, lake, pond, etc. into the boat. In other words a fisherman can most readily remove bait from a bait carrier if the bait is not swimming or moving in the water contained in the carrier. On the other hand, if the bait is to stay fresh it must be kept in water in the carrier. Heretofore there has been no bait carrier which has enabled the bait to stay fresh in a submerged condition and also enabled the fisherman to remove the bait from a non-swimming (bait) condition.

SUMMARY

The present invention provides a construction whereby two or three preformed sections are joined together to provide the live-bait carrier. In the preferred embodiment the sections are fabricated from suitable plastic material, such as a rigid polyester. In the three piece embodiment, two of said sections are "plastic-welded" together to provide the major portion of the carrier hull, while the third section is pressed into place to provide a most useful door for the carrier, as will become apparent hereinafter. In the two-section embodiment the two sections which are "plastic-welded" as mentioned above are molded into one integral piece. The door section becomes the second section in the two section embodiment. In addition, the present live-bait carrier provides a hull construction whose forward section and aft section each is contoured to reduce resistance to movement in the water and thereby reduce objectionable turbulence when the carrier is placed into the river, lake, pond, etc. In addition, this contoured shape is useful in reducing turbulence when the carrier is being towed. The present hull construction is so designed that when the carrier is removed from the river, lake, pond, etc. the water contained therein is drained therefrom in the removing action. On the other hand, the carrier can be removed from the river, lake, pond, etc. in such a fashion that the water in the carrier remains therein after the carrier has been removed. In either mode of removal operation, the carrier can be placed in an upright position in the boat, or wherever it is being used, to either remove the bait from the drained condition or in the alternative so that the water being held in the carrier will not leak from the holes in the hull.

Further in accordance with the design of the present live-bait carrier, the apertures are located in the rear of the hull. Water enters the apertures when the carrier is thrown into the river, lake, pond, etc. If the carrier is towed behind the boat, the water is not permitted to enter the front of the carrier which normally results in a pressure being exerted at the rear of the carrier, which pressure has been found to hurt or kill the bait. Instead the water enters the rear of the hull. Finally, the door is so shaped that it abuts the rear panel of the hull. Accordingly, it scrapes or rubs against the panel when the door is opened. The foregoing described shape of the door keeps it from being spuriously opened, as the carrier is thrown into the water or drawn through any turbulent condition. On the other hand, while this designed restriction of the door prevents it from being spuriously opened, it does not inhibit the door from being easily opened by the fisherman.

Figure 2:
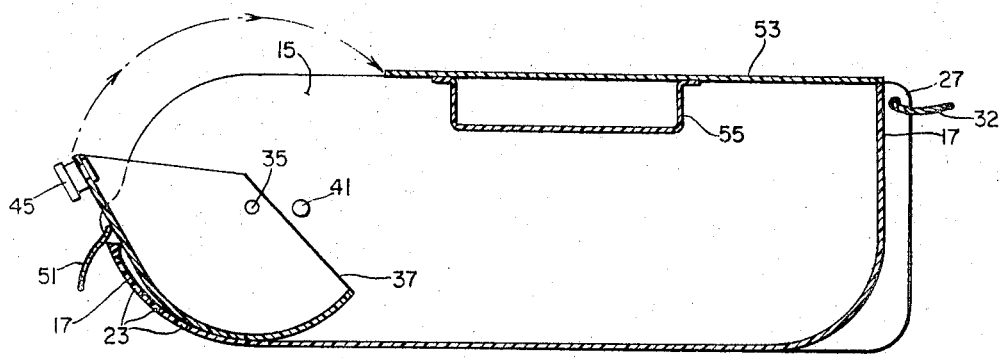

The objects and features of this invention will be best understood by reference to the following description of the invention taken in conjunction with the accompanying drawings wherein:

FIGURE 1 is an exploded view of the three section embodiment, showing three preformed sections which are joined together to make up the carrier; and FIGURE 2 is a sectional side view of the carrier with the door held open.

In FIGURE 1 there is shown an exploded view of the three sections, which in the preferred embodiment are made of plastic. As mentioned above, two of the sections are "plastic-welded" together with the third section being squeezed or press-fitted into the assembly. Now it should be understood that while FIGURE 1 shows three sections which are preformed, the top section 53 and the bottom section 11 could be made integral, i.e., as one part, by molding the entire hull. The description will be directed to the figure showing the three-section embodiment because this is a feasible way of fabricating the carrier and indeed might be a more economical way than the two-section approach. However, it is to be clearly understood that the two-section fabrication approach is within the spirit of the present invention.

In FIGURE 1 there is shown the main hull section 11 which, in the preferred embodiment, is molded as a unitary construction piece. It can be considered in more detail by understanding that there are two side sections 13 and 15 which are joined by center section 17. It will be noted that the center section 17 is formed with curvatures at the rear section 19 of the hull as well as at the front section 21 of the hull. Such a curvature at the rear section 19 enables the water into which the carrier is thrown, or placed, or drawn through, to flow smoothly around either side of the hull, with the hull providing very little resistance to the fluid flow. In a similar fashion the forward section 21 of the middle section 17, is also formed with a proper curvature so that the fluid passing over the forward section of the hull flows in a smooth fashion to minimize turbulence. It can be noted in FIGURE 1 that in one configuration the end pieces of the middle section 17 have a curvature at the bottom, but come up straight and are somewhat squared off with the top edges of side pieces 13 and 15. This embodiment is shown in FIGURE 1 by the solid lines between the sides 13 and 15. On the other hand, the front portion can be readily curved at its upper portion, as shown by the phantom line 18, with a cross piece such as shown by phantom line 22. If the foregoing restrictions in phantom represent the embodiment of the forward section, then the upper section would be ended at the phantom edge 24. On the other hand, the middle section 17 can be completely curved at its upper section to take on the configuration of the phantom line 18 and continue on down to an ending point such as phantom line 26. If the middle section 17 takes this last configuration then the upper section 53 does not exist but the air chamber 55 is attached to the under section of 17 at the upper portion of the carrier hull.

It should be noted that there are two fins 25 and 27 which protrude from the end of the center section 17. These two fins 25 and 27 act to stabilize the hull as it passes through the water. In addition, as will become more apparent hereinafter, the two fins 25 and 27 act to provide a "stand-up" means when the carrier is removed from the water.

In the side sections of the main hull 11 there are provided two apertures 29 and 31. These apertures are provided in order that the studs 33 and 35 (stud 35 being shown in phantom) can be press-fitted into these apertures when the door 37 is assembled with the main hull section 11. It becomes apparent that the door 37 has a contour which is quite similar with the contour of the main hull rear portion so that when the door is fully closed its rear surface 39 in combination with the rear surface of the middle section 17 provides a well defined aerodynamic or fluid-dynamic edge. As described earlier this permits the water to pass over said live-bait carrier with a minimum of turbulence.

The door 37 is stopped in its forward excursion (i.e., to close the door) by the studs 41 and 43 (stud 43 being shown in phantom). On the other hand, the door 37 is stopped in its most backward excursion (i.e., to open the door) by the edge 28 of the rear section 19 abutting the door. The edge 28 comes in contact with the door because the distance from the stud 33 to the surface 39 is greater near the knob 45 that it is near the curved section. The knob 45, of course is used to effect the opening of the door.

It will be noted that the side sections 13 and 15 are formed to have slight protrusions 47 and 49. The protrusions 47 and 49 have apertures therein through which is tied the carry handle 51. It will also be noted in FIGURE 1 that the door 37 has a bowed front edge 38. When the door 37 is seated in the hull the bowed section 38 rubs, or comes in abutment, with the inside of the middle section 17 at the rear section 19. The bowed section 38 keeps the door 37 from being jarred open, or easily opened, in response to some movement of the live-bait carrier (such as being thrown in a lake). On the other hand, it is a simple matter for the user to open the door 37 simply by overcoming the frictional resistance of the bowed section 38 against the inside of the middle section 17.

The upper section 53 of the carrier hull is formed to have its lower edges meet the upper edges of the two side sections 15 and 13 as well as the upper edge of the center section 17 at the front position. The upper section 53 is secured, or bonded, to these edges to form a final assembly, and hence the whole structure is complete. It will be noted that there is shown, partially in phantom, an inner chamber 55 which is secured to the underside of the upper section 53. The air chamber 55 acts to buoy-up the live-bait carrier, or keep it afloat, when it is in the river, lake, pond, etc. The air chamber 55 is secured to the upper section 53 so that the live-bait carrier always becomes positioned with its upper surface above the surface of the river, lake, pond, etc. and its lower portion submerged; hence assuring that the live-bait carrier is always in the proper position irrespective of how it is thrown into or positioned in the water.

Now the present live-bait carrier has a decided advantage from a construction standpoint. At present the live-bait carrier, in one embodiment, is made of two preformed pieces or sections, and in another embodiment it is made of three preformed pieces or sections. In the embodiment shown in the figure the main hull section 11, the door section 37 and the upper section 53 form the three section embodiment. As was stated earlier, in the preferred embodiment, the sections are made of plastic and the upper section 53 is simply "plastic-welded" to the main hull section 11 along the upper edges of the main hull sections 15, 17 and 13. In the two-section fabrication of the embodiment the upper section 53 and the lower section 11 would be integrally formed as one piece. Also as was stated earlier, the door 37 is simply squeezed to fit the studs 33 and 35 into the apertures 31 and 29, thereby enabling the door 37 to be hinged by the studs 33 and 35. When the door 37 is moved to the most forward position, it is stopped by the studs 41 and 43, thus closing the live-bait carrier. The bowed section 38 keeps the door 39 in a closed position. When the door 37 is moved to the most open position it is stopped against the edge 28.

In FIGURE 2 the carrier is shown in a sectional side view. As can be seen in FIGURE 2, when the door 37 is fully opened so that it comes to rest against the middle section 17, the user can see the full length of the interior of the carrier. Hence, the amount and/or position of the bait located in the carrier can readily be determined. In addition, the door 37 is so formed that the opening which is provided in the hull, by positioning the door in the position shown in FIGURE 2, is more than ample to enable the user to insert his hand, even a portion of his arm, in order to remove bait from the carrier or in the alternative to insert a small net for the purpose of netting the bait held by the carrier.

The position of the air chamber 55 can also be better seen in FIGURE 2. When the carrier is thrown into the water of the river, lake, pond, etc. this water enters the holes 23 thereby enabling the bait, held by the carrier, to be submerged in water contained within the carrier. Now when the fisherman has an occasion to remove the carrier from the river, lake, pond, etc. he simply lifts the carrier out by the front tow rope 32 and in so doing the water within the carrier runs through the apertures 23 back into the lake, river, pond, etc. In this action the carrier is brought aboard the boat. The fisherman now grasps the carry handle 51 and inverts the position of the carrier and stands the carrier on the stand-up means 25 and 27. The bait can be specifically selected by making certain the door is closed after the water has been drained and shaking the bait to the door end before opening the carrier door. It will be remembered that the water in the carrier has been drained, or virtually drained, therefrom when the carrier was removed by the tow rope 32. The fisherman now opens the door 35 and the bait can be readily removed because they are not in a submerged (swimming) condition. As soon as sufficient bait has been removed, the door 39 is closed and the bait carrier is thrown back into the water of the river, lake, pond, etc.

While the foregoing description sets forth the principles of my invention in conjunction with the embodiments shown, it is to be clearly understood that this description is made only by way of example and not as a limitation to the scope of the invention as set forth.

What is claimed is:

1. A live-bait carrier being defined by a forward part, an aft part, an upper part and a lower part comprising: a main hull piece having two side sections, a top section and a middle section integrally joining said two side sections and said top section; each of said side sections being formed to extend beyond the forward part of said middle section, and said middle section being formed to enable said carrier to be moved through water with a minimum of turbulence; said top section having an air chamber secured to its underside and so secured that said air chamber is disposed within said main hull section; and a door section having hinging means integral therewith and mounted with said side sections to be hinged at the aft part of said carrier thereby enabling said door section to be partially rotated into and out of said main hull section.

2. A live-bait carrier according to claim 1 wherein said main hull piece is formed of two individual unitary constructed pieces, a first of said individual unitary constructed pieces comprising said two side sections and a said middle section integrally joining said two side sections and the second of said individual unitary constructed sections comprising said top section, said top section being secured to the upper part edges of said two side sections and the upper part and forward part edge of said middle section.

3. A live-bait carrier according to claim 1 wherein said aft part of said main hull section includes a plurality of apertures which enable water to pass into said main hull section for the purpose of submerging bait carried thereby.

4. A live-bait carrier according to claim 3 wherein said apertures are so located in said main hull section that when said carrier is removed by lifting said forward part from the water first, the water within said carrier is drained therefrom in response to the lifting action.

5. A live-bait carrier according to claim 1 wherein said door section has its outer surface formed similarly to the aft part of said middle section whereby when said doors close said carrier can be moved through water with a minimum of turbulence.

6. A live-bait carrier according to claim 1 wherein said main hull section and said door section are each unitary constructed of plastic material.

7. A live-bait carrier according to claim 1 wherein said side sections have substantially straight edges running from said lower part to said upper part at the portion extending beyond the forward part of said middle section in order to provide a stand-up means for said carrier.

8. A live-bait carrier according to claim 1 wherein said door section is bowed to rub against the inner surface of said middle section so that said door section cannot be spuriously opened.

9. A live-bait carrier according to claim 1 wherein said side sections are formed, at the portion which extends beyond the forward part of said middle section, to enable said carrier to have stability when moved through water.

References Cited

UNITED STATES PATENTS

| | | | |
|---|---|---|---|
| 1,619,634 | 3/1927 | Roat | 43—55 |
| 1,630,131 | 5/1927 | Messinger | 43—56 |
| 2,657,496 | 11/1953 | Spotswood | 43—55 |
| 2,149,996 | 3/1939 | Gulden | 43—56 |

HUGH R. CHAMBLEE, Primary Examiner